Figure 1:
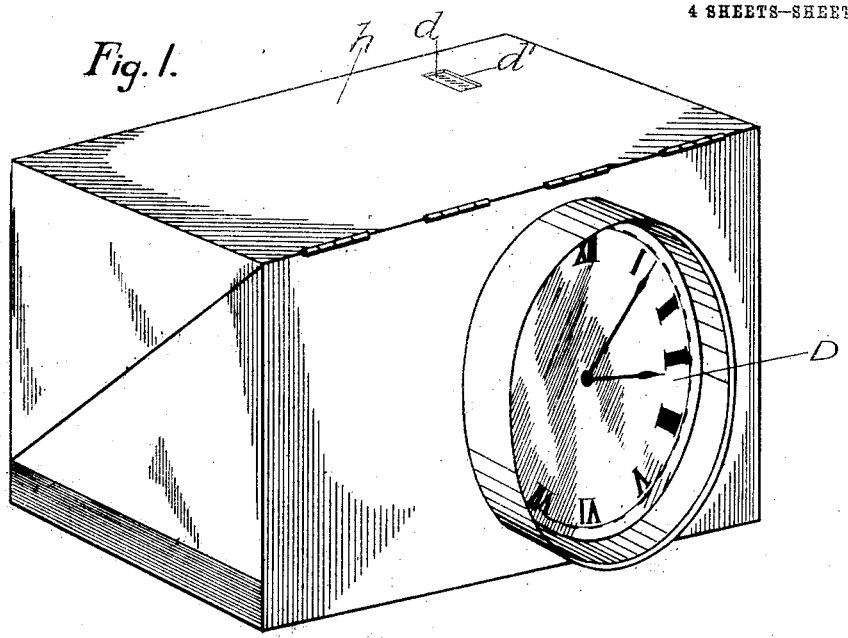

J. T. QUIGLEY.
TIME COST METER.
APPLICATION FILED JULY 14, 1908.

1,080,165.

Patented Dec. 2, 1913.

4 SHEETS—SHEET 1.

WITNESSES:

INVENTOR
John T. Quigley
ATTORNEYS

J. T. QUIGLEY.
TIME COST METER.
APPLICATION FILED JULY 14, 1908.

1,080,165.

Patented Dec. 2, 1913.

4 SHEETS—SHEET 2.

WITNESSES:

INVENTOR
John T. Quigley

ATTORNEYS

J. T. QUIGLEY.
TIME COST METER.
APPLICATION FILED JULY 14, 1908.
1,080,165.
Patented Dec. 2, 1913.
4 SHEETS—SHEET 3.
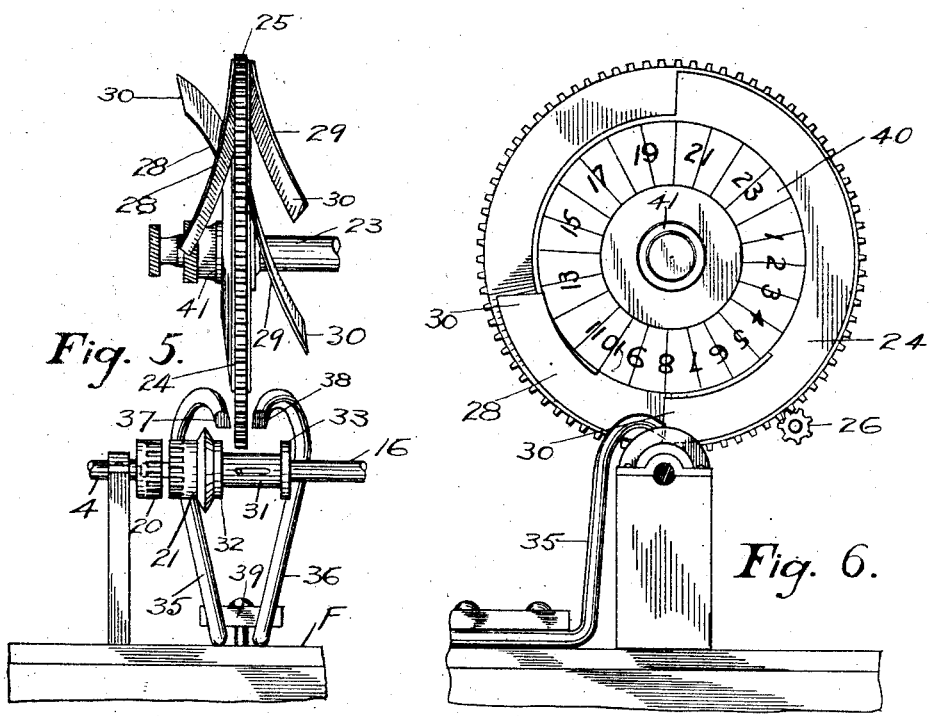
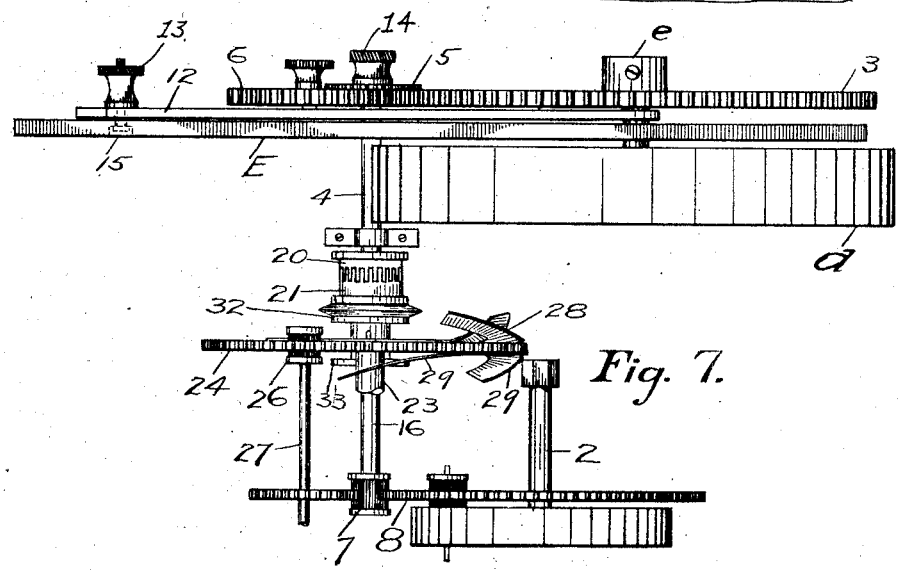
WITNESSES
INVENTOR
ATTORNEYS

J. T. QUIGLEY.
TIME COST METER.
APPLICATION FILED JULY 14, 1908.

1,080,165.

Patented Dec. 2, 1913.

4 SHEETS—SHEET 4.

Fig. 8. Fig. 9. Fig. 10.

WITNESSES:

INVENTOR
John T. Quigley

ATTORNEYS

UNITED STATES PATENT OFFICE.

JOHN T. QUIGLEY, OF SAN FRANCISCO, CALIFORNIA, ASSIGNOR TO THE COSTMETER COMPANY, A CORPORATION OF CALIFORNIA.

TIME-COST METER.

1,080,165.  Specification of Letters Patent.  Patented Dec. 2, 1913.

Application filed July 14, 1908. Serial No. 443,506.

*To all whom it may concern:*

Be it known that I, JOHN T. QUIGLEY, a citizen of the United States, and a resident of the city and county of San Francisco, State of California, have invented a new and useful Improvement in Time - Cost Meters, of which the following is a specification.

The invention relates to a calculating and recording machine of a type in which the result of the calculation, or the record, is given in terms of linear measure.

The object of the invention is to provide a device which will produce a permanent and removable record of the money value of any quantity at a given rate per unit; the monetary value of the record being proportional to its linear measurement. In the computation of the cost of labor in units of money, by the use of this device, the length of the record, when applied to a fixed scale, gives the money value of the operative's time. The machine is adapted to provide means for mechanically measuring the cost of time of any person engaged in any employment in which a stated sum of money is the compensation for a certain period of actual work, and for producing a permanent and removable record of such result.

The device is adapted for general use as a calculating and recording machine and may be used for obtaining a record of the money value of articles which are valued at a fixed rate for a certain quantity. I have termed the device a time cost meter, but it is evident that it can be used for recording the cost of other quantities, by an adjustment of its parts. When used as a time cost meter, the device embodies time mechanism which operates on a tape or strip of paper, advancing it at a rate per hour conforming to the rate of wages of the operative. When used as a calculating machine, the time mechanism is dispensed with and the mechanism is operated manually to produce the required result and record.

The records of the machine are made by employing measurable distances as the equivalents of quantities, a certain distance being arbitrarily chosen as the unit. By this method a given quantity has its equivalent in the distance between two points and may be so expressed, and a given distance is the equivalent of a definite quantity and may be so read, when measured by a scale provided for its conversion into equivalents of notation.

The invention embraces the combination of a tape or record strip with mechanism for moving the same a distance past a given point for a given movement of the driving means. When one revolution of the driving means represents one hour, the distance moved by the tape represents the money value of one hour to correspond to a selected wage unit, and when one revolution of the driving means represents a unit of another quantity, the distance moved by the tape represents the money value of that unit to correspond to a selected unit value.

In that type of machine in which time controlled mechanism is employed to feed the record tape, a novel starting and stopping device is used whereby the movement of the tape is caused to begin, continue and end at certain periods of time changeable, or variable at will. This mechanism is controlled and actuated by the time mechanism and may be set to vary the periods of rest or no movement to any desired length.

The invention consists also of means for converting or reducing the linear dimensions of the tape as operated on by the mechanism into its equivalent in other values.

The following description explains at length the nature of my said invention and the manner in which I proceed to perform and carry out the same, reference being had to the accompanying drawings representing a machine embodying my invention which is driven by a time-mechanism.

Figure 2:
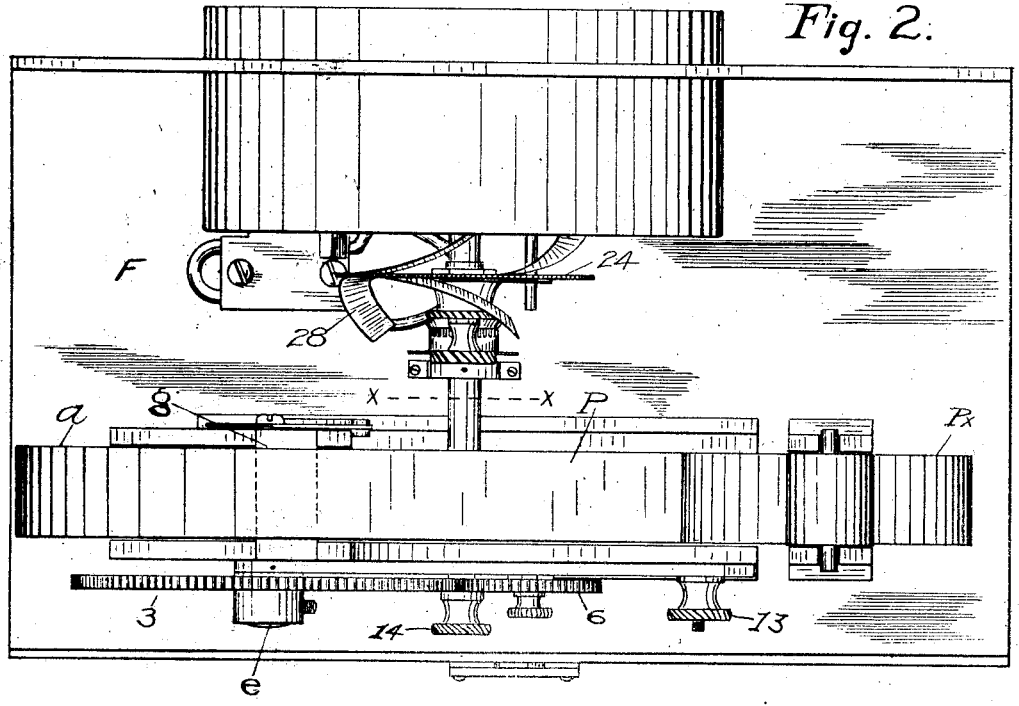
Figure 3:
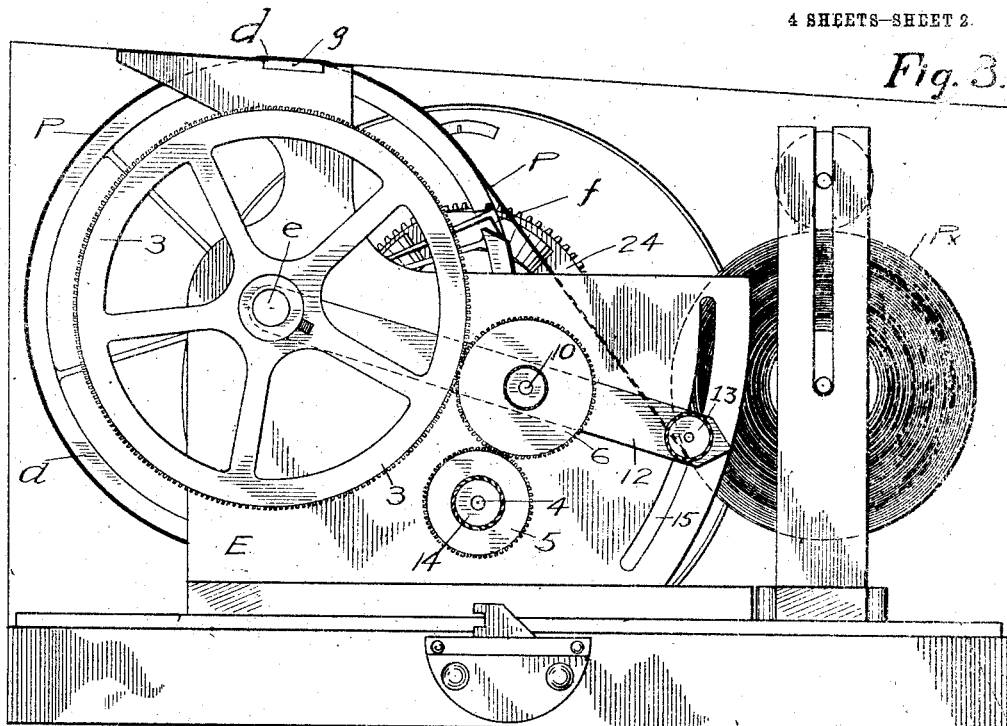
Figure 4:
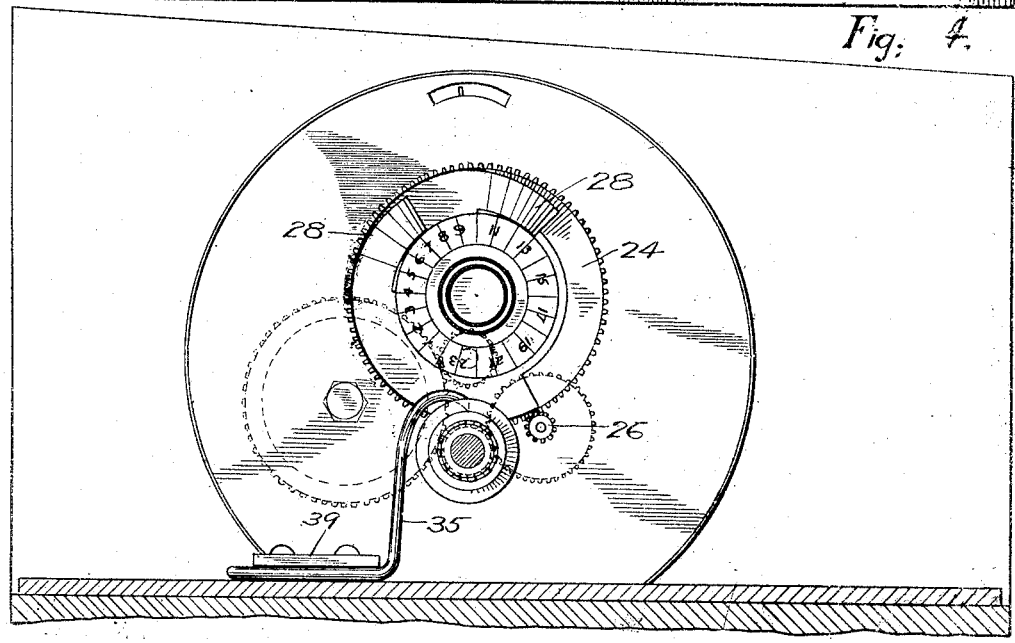

Figure 1 is a perspective-view of the complete machine which has already been constructed and operated by me. Fig. 2 is a plan or top-view of the machine on an enlarged scale, with the cover removed. Fig. 3 is a side-elevation, also on an enlarged scale, taken from the side opposite to that on which the clock-dial is placed. Fig. 4 is a longitudinal sectional-view in elevation through the line *x—x* Fig. 2, showing the time-controlled starting and stopping mechanism. Figs. 5, 6 and 7 are details of the last described mechanism; Fig. 5 being a front-view, Fig. 6 a side-view from the left side of Fig. 5 and Fig. 6 is a plan or top-view. Fig. 8 illustrates the time-cost scale and record-sheet provided for use with the said machine, by means of which the linear dimensions of the record-tape as it is taken from the cost-meter are converted into or reduced to the proper equivalent in money. Fig. 9 shows a tape marked with figures indicating equal subdivisions of time periods; and Fig. 10 shows a tape marked with figures indicating equal subdivisions of five-cent cost periods.

The machine herein illustrated is of such size and cost as to make it practicable to appropriate one to the use of each operative whose time in units of money, or time-cost, as I have termed it, it is desired to measure or determine for any given work-period of his employment, and which may be used by him without leaving his work.

In the preferred form or construction of the machine a revoluble drum or broad faced wheel $a$, constitutes a carrier or means of moving or feeding a paper or strip P of indefinite length beneath or behind an opening $d$ in the cover $h$ inclosing and protecting the mechanism. The axle $e$ of the drum $a$ is connected with or into one of the arbors 2 of a clock-movement by mechanism such as cogged wheels and pinions 3, 5, 6, 7, 8 so as to have motion in time with the clock, and be driven continuously during a work-period of any length of time at a peripheral speed the rate of which is determined and regulated by properly proportioning the connecting gearing as hereinafter explained. At a point on the rim of this drum $a$ which is the preferred embodiment of the tape-carrying means $a$, one end of a roll or a strip of paper tape P is attached to the carrier by a clamp—such as $f$, Fig. 3, and being thus connected or attached, it is wound or laid on the drum as the latter is revolved on its axle by the time mechanism. By this means the tape P is carried under or behind the point of exposure $d$ with a regular movement and at a predetermined rate of speed.

In the present embodiment of the invention I make use of a scale of linear measurement for the tape P in which six inches represent one dollar, so that if the smallest indicated graduation or division of the scale be one cent, the same will be represented by six one-hundredths of an inch of linear dimensions or quantity of the tape. Another division used, by which the scale may be more easily read, is of three-tenths of an inch, indicating five cents in money. The principal unit of time-cost measurement in a tape thus divided or graduated will be five cents of money represented by three-tenths of an inch of the tape. These divisions of three-tenths of an inch being further divided into five equal parts representing one cent each. Any desired scale can be adopted for use in connection with the machine, however, and I give the foregoing relative proportions of length to money-value in the tape merely for the purpose of description and illustration.

For the part P which I have herein termed the tape, a relatively narrow strip or web of paper is provided, either in the form of a continuous roll $P^1$, of indefinite length, or in separate strips of a definite length, sufficient for use during one day, or for several days. This tape is usually gummed on one side for conveniently fixing it on the record sheet S.

Beneath the opening $d$ through which the tape is exposed for making the desired entries a plate $g$ overlying the tape-carrier forms a platen or support for the tape under the opening $d$ and also a guard to prevent the drum from being reached and tampered with from the outside. This is usually done by marking a line transversely across the exposed surface of the tape, using the upper or forward edge $d^1$ of the opening for a guide, and just below this mark the figures or characters employed to identify the operative and the job are inscribed on the exposed tape. At the end of the job or work-period, the operative also marks a line across the tape at the same edge $d^1$. At the end of the operation, or when the tape-feeding mechanism stops, the linear quantity of tape that is found to be included between the two lines marked respectively at the beginning and the termination of the job or work-period, will express by its length the time-cost of that period, or the cost of the particular job or piece of work at the wage rate paid the operative.

The entries or records made on the tape by the operative as above described comprise all the writing, figuring or other mechanical operations required to be made excepting the application of the measured tape to the scale sheet S, by means of which the linear dimensions of the strip after it is removed from the machine are reduced to or converted into terms of money. From this scale the total wages earned by the operative in the given work-period as indicated by the strip, is read from the division of highest value on which the one end of the strip will rest when the opposite end is placed at zero on the scale.

A blank or plain tape with no marking on its face at the time it is placed in the machine for use is preferably employed. But for convenience in computing from the linear dimensions of the tape P the time consumed in any recorded operation without resorting to a mathematical computation of the time based on the money value of the record-strip, the tape is marked or printed at properly spaced intervals with figures or characters indicating hours and minutes of the day, as illustrated in Fig. 9. It should be mentioned also, that the cost or money-value of the time as expressed by the linear quantity of the tape acted on by the time-mechanism can be indicated and determined directly from the record-tape by marking off the tape into divisions representing units of money, and such divisions being properly spaced so as to conform to the rate of wages received by the operative, are printed or otherwise permanently marked on the tape before it is placed in the machine. A record strip from a tape of this character will consequently indicate by a reading of its figures the sum total of the wages earned by the operative in that period, while its length will indicate the amount of time consumed in the operation. Fig. 10 represents a record-strip taken from the tape thus divided and marked in units of money.

The record-tape P in either of the forms used in this machine as before described is moved continuously during the working hours of the day under the opening $d$ by time mechanism for which clock-work of any well known construction can be used. The rate of speed of such movement, in the machine used by a particular operative, is so regulated that the quantity of record-surface moved past a given point in a given time shall express or indicate by its units of length certain units of money—the sum total of which will equal the wages of the operative for that period of time—according to the scale of money units adopted. For example: With the present scale of 6 inches representing a money value of $1 for the basis of calculation, if the operative receives $12 for a week of 48 hours, the speed of the tape-feeding means is so regulated that the tape will be moved at a rate of 1½ inches an hour and that linear dimensions will represent a wage rate of 25 cents. The necessary power for this movement is transmitted from the main-spring shaft 2 of the clock-work to the tape-carrier through the medium of a train of gears.

The relative diameters of the gears necessary to advance the record tape the proper distance for one revolution of the driving shaft are governed by the following elements: first, the circumference in inches of the tape wheel; second, the length of the scale selected to represent one unit of the quantity which it is desired to have recorded; and third, on the ratio between the numerical values of the quantities entering into the calculation.

In the type of machine herein selected for the purposes of description, which I have termed a time-cost meter, and which is adapted to be operated by time mechanism to record the money value of time, I have selected a scale in which the value of one dollar is represented by six inches and the circumference of the tape bearing wheel is twelve inches. The arbor 4 connecting the drive mechanism with the tape feeding mechanism is preferably caused to revolve once an hour, therefore, the ratio of the connecting gearing between the arbor 4 and the shaft $e$ must be such that the tape will be advanced an amount equal to the hourly wage rate of the operative at the rate of six inches representing one dollar for every revolution of the arbor 4. The function of the arbor 4 besides that of transmitting the power by which the tape wheel is operated, is that of the multiplier in making the calculations. The given rate determined by the hourly wage rate and fixed by the ratio of the gears is multiplied by its revolutions, and the number of its revolution is the quantity to which the rate is applied to obtain the required quantity.

The following proportions for the gears in the connecting mechanism are employed in the present machine: The circumference of the gear 3 on the axis of the tape carrier represents the divisor used in obtaining the desired rate, and in the time driven machine is so fixed as to cause the tape feeding mechanism to measure time-cost by the length of the tape on a basis of a given number of hours to each working day, and by varying the circumference this can be so varied as to change the basis of operation to that of any other desired number of hours in a working day. In such a change of length of the working day, however, it is not necessary to change the dimensions of the tape carrier, nor the selected scale of measurement, nor the element governing the rate of pay according to the wages paid, unless a change in the latter case may be desired for other reasons. The circumference of the gear 5 on the arbor 4 represents the dividend used in obtaining the desired rate and in the time cost meter driven by time mechanism those elements represent the weekly compensation in dollars according to the scale of wages paid, and the gear 5 may be varied accordingly in size so as to change the basis of operation of the tape feeding means to that of any weekly rate of compensation. When such variations in the weekly wage rate are made, however, no change is made in the dimensions of the tape carrier, nor in the selected scale of linear measurement, nor in the tape-carrier gear 3, that governs the length of the work day as before explained, unless a change may be desired in the length of the day for other reasons.

The intermediate gear 6 is for the purpose of transmitting motion from the gear 5 to gear 3, and may be made of any suitable size. Provision is made for changing either or both of the gears 3 and 5, for others of different pitch diameters, by shifting the position of the intermediate gear 6, removing the gears from their axles and replacing them with others. For this purpose the stud 10 carrying the gear 6 is slidably mounted in the pivoted arm 12, movable in an arc that is concentric with the axis $e$ of the gear 3, so that the gear may be moved out of mesh with both gears and may be placed in mesh with gears of other pitch diameters.

The stud 4 is screw threaded on the end for a nut 14 that holds the gear in place or allows it to be readily removed from the stud to make the required variation in the proportions of the gears. A clamping device 13 on the outer end of the pivoted arm 12 engaging a slot 15 on the plate face E of the mechanism serves to lock the arm in position after adjustment.

For the purposes of illustration, I will assume that the proportions of the two ratio-giving gears are as 48 to 192, and the ratio consequently $\frac{1}{4}$. One revolution of gear 5, therefore, rotates gear 3 and the tape carrier $a$ a distance of $\frac{1}{4}$ of a revolution. As the circumference of tape carrier $a$ is 12 inches, and a scale of six inches representing one dollar is used, a complete revolution of the tape carrier will represent two dollars or 200 cents. The rotation of the tape carrier therefore, caused by a complete revolution of gear 5, represents 50 cents or $192 \div 48 \times \$2.00$. The machine so adjusted, therefore, will indicate by the length of the tape carried past a certain point, the result of 50 multiplied by the number of revolutions of the arbor 4, or any part of a revolution.

Various schedules of quantities may be applied to this machine for the purposes of calculation. For example, in the machine herein illustrated, the revolutions of the arbor 4 represent hours, the units of the pitch circle of the gear 5 represents dollars, the units of the pitch circle of gear 3 represents hours, and the units of linear measure on the tape carrier or the tape represents cents. The result of one revolution of the arbor 4 would then be the calculation of the value of one hour at the rate of $24. for 48 hours, namely, 50 cents; and any part of such revolution would register the value of that proportionate part of an hour at that rate.

A novel feature in the time-controlled mechanism by which the tape-feeding means is operated at a predetermined rate of speed per hour, consists in an automatically operating stop-motion combined with the time operated shaft and with the tape-carrier for operation in such manner that the motive power will be shut off or disconnected and the movement of the tape will be arrested at the end of a given work-period, and also connects with the tape-carrier to start the tape at the beginning of a work-period, without depending on or requiring the attention or manipulation of any one. This feature of the invention is also automatic in its operation of stopping the tape and holding the tape-feeding means out of action at any given period or periods of greater or less duration, between the beginning of the work-period and the end of such period, so as to suspend the operation of the recording mechanism during stated or predetermined intermissions in the working period. In this feature of controlling its operation on the tape with the effect to put it in motion at the beginning of the work-period and to stop it at the end of the period and with or without intermissions of rest, the time-mechanism of my invention is rendered independent of alteration or adjustment on the part of an operator, besides inaccessible to and beyond the control of the operative using it.

The stop-motion in this machine as I have constructed and operated it involves several novel parts and features which will now be described with reference more particularly to Figs. 5, 6, and 7 of the drawings.

The shaft 16 of the clock-work, and the spindle 4 carrying the pinion 5 are coupled together by a two-part clutch composed of the member 20 fast on the inner end of the spindle 4, and the interlocking member 21 slidable on but also connected to the shaft 16 so as to turn with it. A longitudinal movement of the clutch member 21 will therefore connect or disconnect the two parts 16—4 which connect the pinion 5 and the time-mechanism. Above and also parallel with the shaft 16 a spindle 23 carries and gives motion to a time-controlled clutch-throwing device consisting of a disk 24 driven from the clock-movement through the medium of a toothed rim 25 and a pinion 26 on the arbor 27 the proportions of the gears employed being such that the disk 24 has one revolution every 24 hours moving continuously with the clock-work. On each face of the disk is arranged at proper intervals apart a series of stiff spring-strips having the quality of springing back or outward from the face of the disk with sufficient force to shift the movable member 21 of the clutch when the outer end of the resilient strip is in line with a collar or projection on the slidable member of the clutch. The strips 28 on one face and the like strips 29 on the opposite face of the disk 24 are each attached to the disk at one end but unattached at the outer end 30, so as to stand away or project outward from the disk. They are preferably made of spring-metal of such resiliency that on releasing the outer end 30 after it has been pressed against or toward the face of the disk and allowing it to fly back, its reactive force will be sufficiently powerful to throw the clutch-member 21 and thereby open or close the clutch, according as the particular clutch-throwing strip so released is situated on one, or the other face of the disk 24. As the disk 24 is turned continuously by the time-mechanism the spring strips will act on the clutch at definite times during the work-period as measured by the time-mechanism, according to the particular adjustment of the strips on the disk. In the present construction of this time-controlled clutch-throwing device the resilient strips are concentric with the spindle 23 on which the disk 24 rotates, and are each composed of spring-metal so as to act by virtue of its own resilient quality; thereby avoiding the necessity of using a separate spring behind the strips, if that clutch-throwing member has no resilient quality in itself.

The projections on the sleeve 31 of the slidable clutch-member are the collars 32, 33 situated within the circular path described by the ends 30 of the strips during the motion of the disk 24 on its axis, and also on opposite sides of the plane of rotation of the disk, as seen in Figs. 5 and 6, where the collar 32 on one side of such plane is situated in close relation to the path traversed by the ends of the spring-strips 28 on that face of the disk, that the outer end 30 of any one of the strips 28 that may be released and allowed to fly out after having been depressed will strike the collar 32 with sufficient force to throw the clutch-member 21 into the opposite member 20 when that end of the spring-strip at the moment of its release is in line with the collar. On the other hand, any one of the strips 29 on the opposite face of the disk 24 when similarly depressed and afterward released at the moment of coming in line with the collar 33 on the clutch-member will throw the clutch-member away from the other member 20 of the clutch, and thereby disconnect the shaft 4 from the driving-shaft 16.

The stationary fingers 35—36 situated on opposite sides of the plane of rotation of the disk 24 and in close relation to the faces of the disk, constitute a simple means of pressing inward or closing the spring-strips against the disk the fingers being secured to the bed-plate F by the screw-clamp 39 and their ends 37—38 bent over so as to stand in close relation to the faces of the disk. Such adjustment of the parts as may be found necessary in order to set the end 37 of the finger in more or less close relation to the face of the disk is permitted by securing the fingers on the body in the manner shown and thus the degree of compression and the resulting degree of force with which the strip when disengaged from the finger will react against the clutch-member can be varied as conditions may require.

The points at which the ends 30 of the spring-strips are set around the circle as the same are changed will be seen to control and vary the intervals of rest and movement in the mechanism actuated from the shaft 4; and the spring-strips in each series are for purposes of such adjustment, movable about the axis 23 and capable of being set each at any point or division on the dial 40. For convenience in setting the strips in such manner the dial is divided into hours, or other desired time-intervals and turns uniformly with the disk on the axis 23, the dial being of proper diameter to lap or lie partly over or in front of the ends 30 of the springs as seen in Fig. 6, for the purpose mainly of facilitating setting or adjusting the ends 30 at the desired time-points, from the divisions on the dial. In the present embodiment of this time-controlled clutch operating device the spring-strips are situated between the face of the disk and the dial 40, and the spindle 23 is fitted with a clamp-nut 41 on a screw-threaded portion of the spindle, thereby forming a means of holding the strips in position wherever they may be set.

In the foregoing construction the spring-strips 28 on one face of the disk act on the clutch-member 21 by striking the collar 32, the effect of which is to bring the two clutch-members together and thereby couple the actuating shaft 16 to the shaft 4 to be actuated. On the other hand, the spring-strips 29 on the opposite face of the disk acting against the collar 33 on the clutch-member will separate the clutch and disconnect the power from the shaft 4. The clutch throwing strips on the time-controlled disk 24 are changed and varied according to the periods of motion and rest to be produced in the mechanism being operated from the motor-shaft 2, merely by loosening the nut 41 and setting the ends 30 of the strips at the proper points on the dial 40, after which the strips are clamped by screwing up the nut.

In using the time cost meter to measure and record the cost of time consumed in turning out a given piece of work or performing an operation during a work-period, the speed of the tape-carrier being regulated to conform to the wage-rate per hour as before described by placing on the shaft 4 a pinion having the required number of teeth as before described, the time-mechanism continues to feed or advance the tape during the work-period at a uniform speed until at the end of the work-period or of the job, the length of the tape passed through the feeding mechanism is indicated by making a mark on the exposed portion with a pencil, or by severing the record-strip from the tape at that point. If the work-period is interrupted or divided at given intervals by one or more periods when work is discontinued, the clutch-throwing device is brought into play to disconnect the shaft 4 from the time actuated shaft 16, at the proper time and afterward connect the two shafts by acting on the clutch. From the record-strip thus obtained at the end of the given period the sum total of the wages or cost of time is ascertained directly from a linear measurement of the record-strip, using for that purpose a scale of which the sheet Fig. 8 is one form; or by indicating the units of money-value on the tape as illustrated in Fig. 10, the value of the record-strip in units of money can be read and determined directly from the face of the strip, without using the scale.

One of these machines being appropriated to the use of each operative as has heretofore been stated, and the rate of tape feed for each particular machine being so regulated or adjusted as to accord to the wage rate of its respective operative, a system is thereby provided by this combination of machines for producing comparable records of the time costs of a plurality of operations under different rates.

In the form of machine shown the edge $d'$ of the aperture $d$ serves as a length determining element past which the tape is fed by the automatic feeding mechanism. The rate of feed in each machine being proportional to elapsing time and the characteristic rate of time cost for the operation being performed, it follows that the marked off length of tape as measured by a linear time cost scale (shown in Fig. 8) represents certain time value. The time-cost scale is a multiple-rate scale, being applicable to whatever rate of time cost the several machines may be set or adjusted. A definite length of tape therefore will represent thereon a definite time cost value irrespective either of the elapsed time alone or the time cost rate alone which is associated therewith, whereby it is possible to measure by the aggregate tape lengths the aggregate costs of different operations irrespective of the elapsed time or the time cost rate.

I do not herein claim the method of recording time costs or the novel features of the record alone which is produced thereby or the scale sheet alone, claims thereto being embodied in my copending application Serial No. 484,911, filed March 22, 1909.

The term tape as employed in this specification means a strip or piece of relatively flexible material whether of paper, or cardboard, or of woven fabric capable of being marked by printing, stamping, punching or perforating and whether in the actual form of a tape or web or relatively narrow strip, or otherwise. And by the term record-strip is meant that portion or linear quantity of such record-bearing or forming material which being fed, moved, passed through or acted on by the time-mechanism constitutes by its length a record of the time-cost of the work.

The arbor 4, which is herein shown to be operated by time mechanism is adapted for connection with dials or counting apparatus suited to the character of the calculations involved, by means of which the number of revolutions of the arbor 4 may be registered. In this instance the mechanism is adapted to be operated by manual or automatic movement, and the manner of connecting such counters to indicate the number of revolutions of the arbor is well known and does not require illustration or further description.

What I claim as my invention and desire to secure by Letters Patent is:

1. In a time-cost system, a tape carrier, time controlled mechanism for operating the carrier during fixed periods of time at a substantially uniform speed predetermined to correspond with a selected time-cost unit, means for varying such speed, means for operatively applying to the carrier or cutting off therefrom the source of driving power, means for placing suitable identification marks upon said tape to represent the duration of an elapsed period of time and a scale on which the marked lengths of tape represent time-cost irrespective of the rate of said speed.

2. In a time cost system, a tape carrier, and means to drive said carrier at a substantially uniform speed predetermined to correspond to a selected time-cost rate, said means being adapted to be adjusted to vary the speed to correspond to another selected time-cost rate, means for indicating on said tape the beginning of a time period, and a scale to which said tape may be applied to ascertain time cost irrespective of the said speed.

3. In a time-cost system, the combination of a clock movement, a shaft actuated thereby, a revoluble tape carrier, means for effecting a uniform movement of said carrier during fixed periods of time, the rate of movement being predetermined to correspond to a selected time-cost unit, a gear wheel on the axis of the carrier, changeable gearing connecting the gear wheel with the shaft and a scale of value in conformity to which said rate of movement may be selected.

4. In a time-cost system, the combination of a driving mechanism, a revoluble tape carrier, a gear wheel on the axis of the carrier, means for effecting a uniform movement of said carrier during fixed periods of time, the rate of movement being predetermined to correspond to a selected time-cost unit, a shaft actuated by the driving mechanism, a changeable gear on said shaft, an intermediate gear, means for adjusting the working position of said intermediate gear and a scale of value in conformity to which said changeable gear may be changed.

5. In a calculating and recording system, a tape carrier, time controlled driving means, gearing interconnecting the carrier and its driving means proportioned to cause the carrier to advance the tape a distance for a given time representing the value of the elapsed time at a selected cost rate, said gearing being adapted to be changed to advance the tape at a rate corresponding to another selected cost rate and a scale of value in conformity to which said gearing may be changed.

6. In a time-cost system the combination of a plurality of measuring devices having each an impression surface adapted to receive identification marks indicative of the duration of an elapsed period of time, means for effecting the movement of said surface at a uniform rate of speed during fixed periods of time, said rate of speed for each measuring device being predetermined to correspond to the characteristic rate of time cost for the operation performed, and means for optionally starting and stopping the movement of said surface.

7. In a calculating and recording system a plurality of measuring machines having each a time-controlled shaft, a drum adapted to carry an impression surface, gears interconnecting said shaft and drum whereby the impression surface of each machine is caused in a given period of time to travel a distance representing the time value of that period characteristic of the operation performed and a predetermined multiple-rate scale of distance value in accordance with which said operation is performed whereby the aggregate lengths of the impression surfaces of a number of machines will represent on said scale the aggregate costs.

8. In a time-cost system the combination of a plurality of meters having each a drum adapted to feed a tape, a mechanism for rotating the drum at a substantially uniform speed predetermined at a different rate in each case to correspond to the characteristic rate of time cost for the operation performed, and means for placing suitable identification marks upon said tape to represent by their spacing the money value of the elapsed time whereby the aggregate lengths of the spacings from a plurality of meters will represent the aggregate cost for the respective elapsed times.

9. In a system for producing comparable records of the time cost of a plurality of operations under different rates the combination of a plurality of tapes, a length determining element for each, means for automatically feeding said tapes each relative to its respective length-determining element, the rate of feed in each case being proportional to elapsing time and the characteristic rate of time cost for the operation performed, and a multiple-rate scale of linear value whereby the length of each tape as measured by said scale represents thereon a certain time-cost value irrespective either of the elapsed time or the time cost rate associated therewith.

10. In a system for producing comparable records of the time cost of a plurality of operations under different rates, the combination of a plurality of record surfaces, a length determining element for each, means for automatically feeding said record surfaces each relative to its respective length determining element, the rate of feed in each case being proportional to elapsed time and the characteristic rate of time cost for the operation performed, and a multiple-rate scale of linear value whereby the length of each record surface as measured by said scale represents thereon a certain time cost value irrespective either of the elapsed time or the time cost rate associated therewith.

11. In a system for producing comparable records of the time costs of a plurality of operations under different rates, the combination of a plurality of measuring machines each comprising a casing having a length determining element, clockwork mechanism for automatically feeding a record surface with relation to its length determining element, the said surface after being fed past the length determining element being inaccessible to the operative, the rate of feed in each case being proportional to elapsed time and the characteristic rate of time cost for the operation performed and a linear value multiple-rate scale whereby the length of each tape as measured by said scale represents thereon a certain time cost value irrespective either of the elapsed time or the time cost rate associated therewith.

12. In a system for producing comparable records of the time cost of a plurality of operations under different rates, the combination of a plurality of measuring machines each comprising a closed casing having a length determining element, means for automatically feeding a continuous record surface of indefinite length during work periods at a definite rate per unit of time with relation to the length determining element, the rate of feed in each case being proportional to elapsed time and the characteristic rate of time cost for the operation performed whereby said surface may be marked at unpredetermined points and irrespective of arbitrary or predetermined subdivisions and thereby subdivided into lengths, and a linear value multiple-rate scale whereby any of said subdivided lengths from any of said records when measured by said scale represents thereon a certain time cost value irrespective either of the elapsed time or the time cost rate associated therewith.

13. In a system for producing comparable records of the time cost of a plurality of operations under different rates, the combination of a plurality of measuring machines each comprising a closed casing having a length determining element, clockwork means for automatically feeding a continuous tape of indefinite length with relation to the length determining element, said feed taking place during work periods and at a definite rate per unit of time, and the said tape both before and after passing the length determining element being inaccessible to the operator, the rate of feed in each case being proportional to elapsed time and the characteristic rate of time cost for the operation performed, whereby said tape may be marked at unpredetermined points and irrespective of arbitrary or predetermined subdivisions and thereby subdivided into lengths, and a linear multiple-rate scale whereby each of said lengths as measured by said scale represents thereon a certain time cost value irrespective either of the elapsed time or the time cost rate associated therewith.

14. The combination with a time cost meter comprising a tape holder, a length determining element, mechanism for automatically feeding successive portions of the tape past said length determining element at a rate proportional both to elapsed time and the value of a unit of time, whereby the tape may be marked at the beginning and again at the close of a given operation and thereby subdivided into lengths irrespective of predetermined subdivisions but corresponding accurately to the time cost of successive operations and a scale marked and provided in units of value to which any marked length of tape may be applied to ascertain the equivalent time cost.

15. In a system for producing comparable records of time cost of a plurality of operations under different rates, the combination of a plurality of time cost meters each having means for holding a continuous record surface, a length determining element, means for automatically feeding successive portions of said surface past said length determining element, the rate of feed in each case being proportional to elapsed time and the characteristic rate of time cost for the operation performed whereby the surface may be marked at the beginning and again at the close of a given operation and thereby subdivided into parts irrespective of predetermined or arbitrary subdivisions, and a multiple-rate scale marked in units of value to which the marked lengths of record surface may be applied whereby the marked length of each surface as measured by said scale represents thereon a certain time cost value irrespective either of the elapsed time or the time cost rate associated therewith.

16. In a time cost system the combination of a plurality of measuring devices having each a record surface, a length-determining element for each surface, means whereby the surface may be moved relatively to the length determining element proportionally both to elapsed time and time cost and a linear multiple-rate scale whereby the length of each record surface as measured by said scale represents thereon a certain time-cost value irrespective either of the elapsed time or the time cost rate associated therewith.

17. In a time-cost meter, means whereby a record surface may be moved proportionally both to elapsed time and time cost rate, means for changing the rate of movement to correspond to changes in the time cost rate and means for indicating on said surface the beginning of a time period.

18. In a system for producing comparable records of time-cost of a plurality of operations under different rates, the combination of a plurality of time-cost meters each having means for holding a continuous record surface, a length-determining element, means whereby said surface may be moved with relation to said length determining element proportionally both to elapsed time and time cost rate, whereby the surface may be marked at the beginning and again at the close of a given operation and thereby subdivided into parts irrespective of predetermined or arbitrary subdivisions, and a multiple-rate scale marked in units of money to which the marked lengths of record surface may be applied, whereby the marked length of each surface as measured by said scale represents thereon a certain time-cost value irrespective either of the elapsed time or the time-cost rate associated therewith.

19. In a time-cost system, the combination of a plurality of continuous tapes corresponding to different time cost rates marked at intervals to produce subdivisions corresponding in length to the actual time-cost of a succession of operations and irrespective of arbitrary or predetermined subdivisions, and a linear time-cost multiple-rate scale marked in units of value whereby the marked subdivisions of the tape when applied to said scale show thereon the time cost of the operation corresponding thereto, and whereby subdivisions taken from different tapes corresponding to different time-cost rates may be aggregated to indicate the aggregate cost of the corresponding operations.

20. In a system for producing comparable records of the time cost of a plurality of operations under different rates, the combination of a plurality of measuring devices having each means for holding a record substance, a dimension-determining element, means whereby relative movement may be caused between the dimension-determining element and the substance and the latter subdivided into identified parts the dimensions of which are proportional both to elapsed time and to the time-cost rate for the operation performed, and a common multiple rate standard of value or scale whereby said parts when measured by said common standard will denote the time cost of the corresponding operation irrespective of the elapsed time or the time cost rate.

JOHN T. QUIGLEY.

Witnesses:
WM. K. WHITE.
E. E. OSBORN.